United States Patent [19]

Conroy et al.

[11] 4,423,852

[45] Jan. 3, 1984

[54] APPARATUS FOR LIFTING A FLEXIBLE CABLE

[75] Inventors: George J. Conroy, Bethel Park; Melvin N. Ackerman, Pittsburgh, both of Pa.

[73] Assignee: The United States of America as represented by the Secretary of the Interior, Washington, D.C.

[21] Appl. No.: 317,652

[22] Filed: Nov. 2, 1981

[51] Int. Cl.³ .............................................. B66D 3/00
[52] U.S. Cl. ................................. 254/264; 242/86.51; 191/12 R; 414/680; 254/323; 254/389
[58] Field of Search .................. 254/389, 323–327, 254/134.3 R, 134.3 CL, 134.3 FT, 134.3 SC, 264; 242/86.51, 157 R; 191/12 R; 137/355.12, 355.2, 355.24, 899.1; 226/199; 414/569, 680

[56] References Cited

U.S. PATENT DOCUMENTS

| | | | |
|---|---|---|---|
| 972,457 | 10/1910 | Kohler | 191/12 R |
| 1,514,148 | 11/1924 | Forssblad | 242/86.51 X |
| 1,560,789 | 11/1925 | Johnson et al. | 137/355.24 |
| 1,739,938 | 12/1929 | Barnett | 254/325 X |
| 2,844,119 | 7/1958 | Dugan | 254/323 X |
| 3,347,526 | 10/1967 | Cymmer et al. | 254/389 X |
| 3,943,306 | 3/1976 | Aihara et al. | 242/86.51 X |
| 4,278,238 | 7/1981 | Vugrek | 254/134.3 FT |
| 4,337,922 | 7/1982 | Streiff et al. | 254/134.3 FT |
| 4,350,323 | 9/1982 | Charles et al. | 254/389 X |

FOREIGN PATENT DOCUMENTS 2930241 2/1981 Fed. Rep. of Germany .... 191/12 R

Primary Examiner—John M. Jillions
Attorney, Agent, or Firm—Ronald C. Williams; Donald A. Gardiner

[57] ABSTRACT

In mining operations, a number of mining machines will have flexible cable attached thereto which then drag along behind the machine as it operates. When the machine moves in a backward direction, the machine often times will run over and damage the cable. In the past, the cable has been moved manually to prevent damage. The disclosed invention provides an automatic device which will lift a predetermined length of cable above the groun so that the cable will not be cut as the machine moves backward a given distance.

3 Claims, 7 Drawing Figures

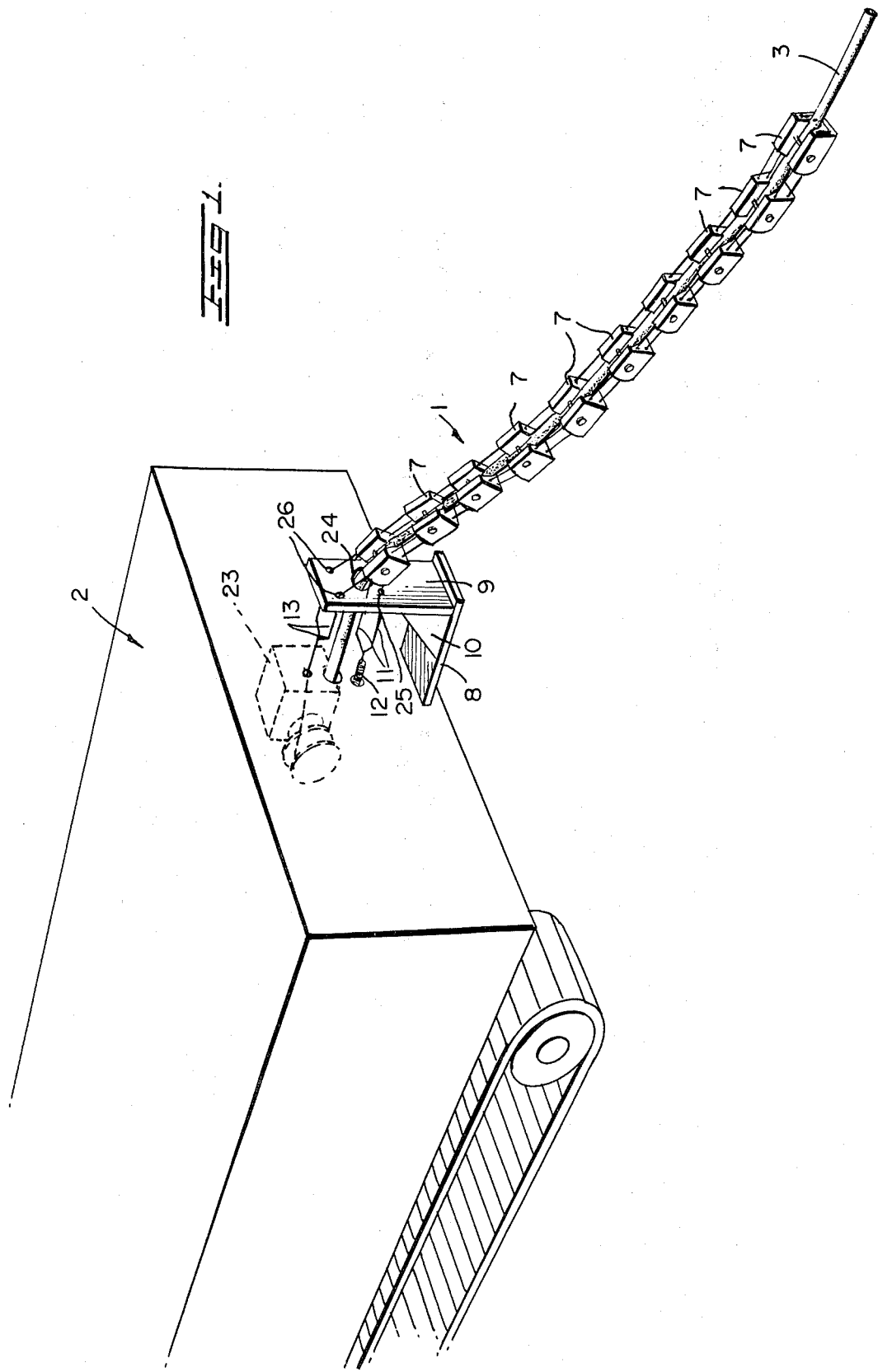

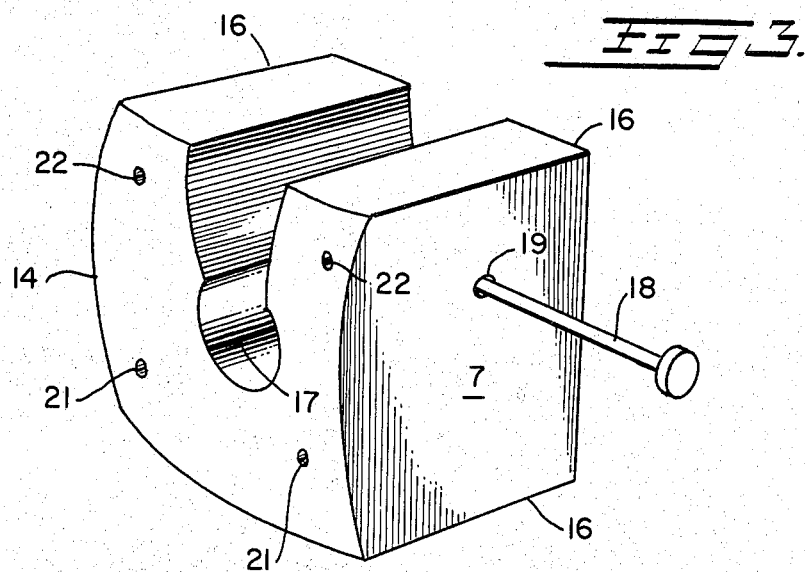
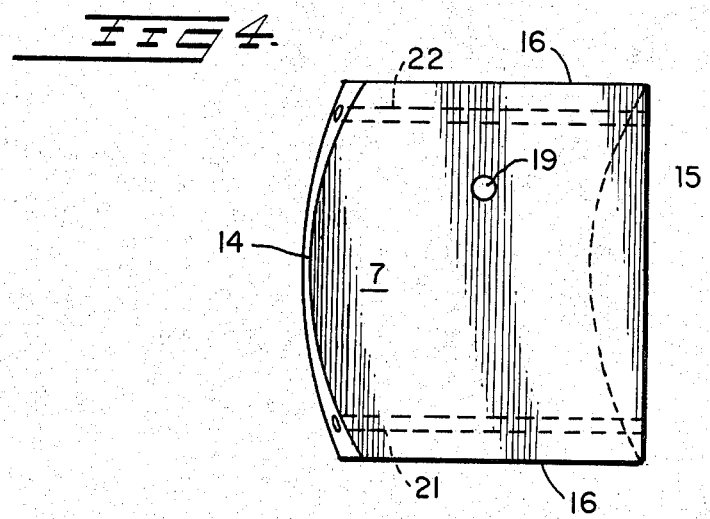
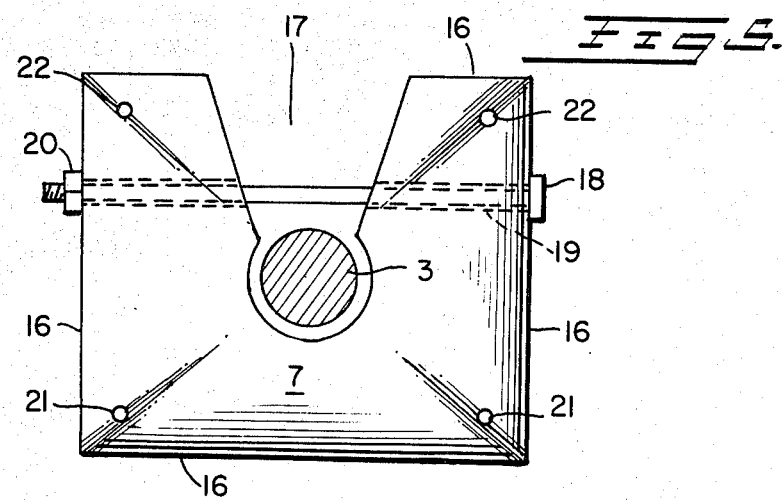

APPARATUS FOR LIFTING A FLEXIBLE CABLE

BACKGROUND OF THE INVENTION

Field of the Invention

This invention relates to the field of handling, supporting, and lifting devices, and, in particular, to cable handling devices.

SUMMARY OF THE INVENTION

The disclosed invention provides a device for selectively stiffening and lifting a predetermined length of a flexible cable. The device has a plurality of generally rectangular-shaped blocks, each mounted on the cable and each having a convex front face and a concave back face; a support frame; a set of retaining wires which loosely maintain the blocks in position on the cable; a set of cable lifting wires passing through the upper portion of each block; and a means for retracting the upper wires through the support frame. As the cable lifting wires are retracted through the frame, the blocks are pulled closely together and stiffened to form a rigid body with the forwardmost block pressed against the frame. As the cable lifting wires are further retracted, the rigid body is caused to rotate upward about the contact point between the front face of the forwardmost block and the frame. When the cable lifting wires are untensioned, the blocks become unstiffened and the length of cable is again flexible and freely moveable.

It is an object of this invention to provide a means for moving a predetermined length of cable away from the wheels or treads on a piece of machinery.

It is another object of this invention to provide an automatic means for moving a predetermined length of cable away from the wheels or treads on a piece of machinery.

It is yet another object of this invention to provide a device that will lift a length of cable off the ground when the machinery is moving in a backward direction and return the cable to the ground when the machine is moving forward.

BRIEF DESCRIPTION OF THE DRAWINGS

FIG. 1 is a perspective schematic view of the cable lifting device 1 mounted on a representative machine 2 with the device 1 and the flexible cable 3 in a relaxed position.

FIG. 3 is a perspective representation of the rectangular-shaped blocks 7.

FIG. 4 is a side view of one of the blocks.

FIG. 5 is a front view of one of the blocks.

DETAILED DESCRIPTION OF THE PREFERRED EMBODIMENT

Figure 2A:
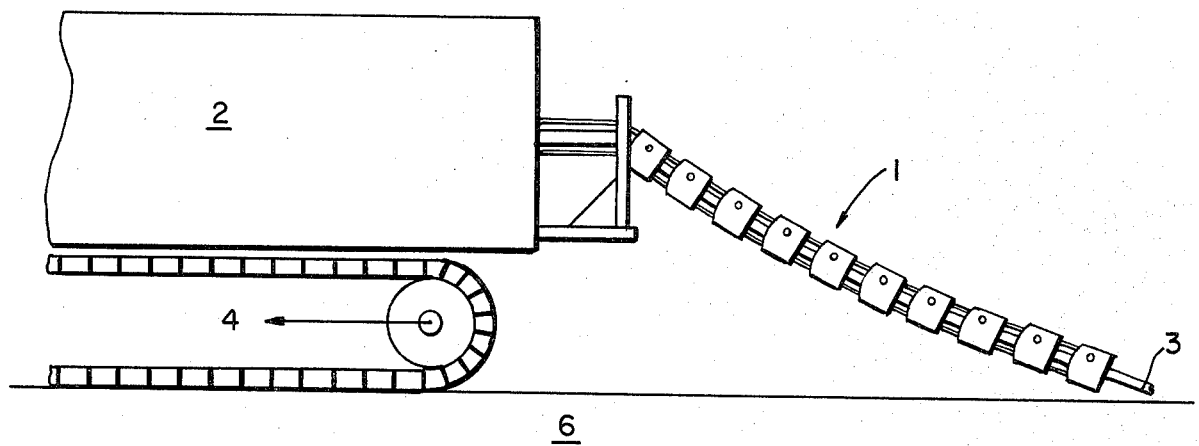
FIGS. 2a-c consist of a series of schematic representations of the cable lifting device in operation.
Figure 2B:
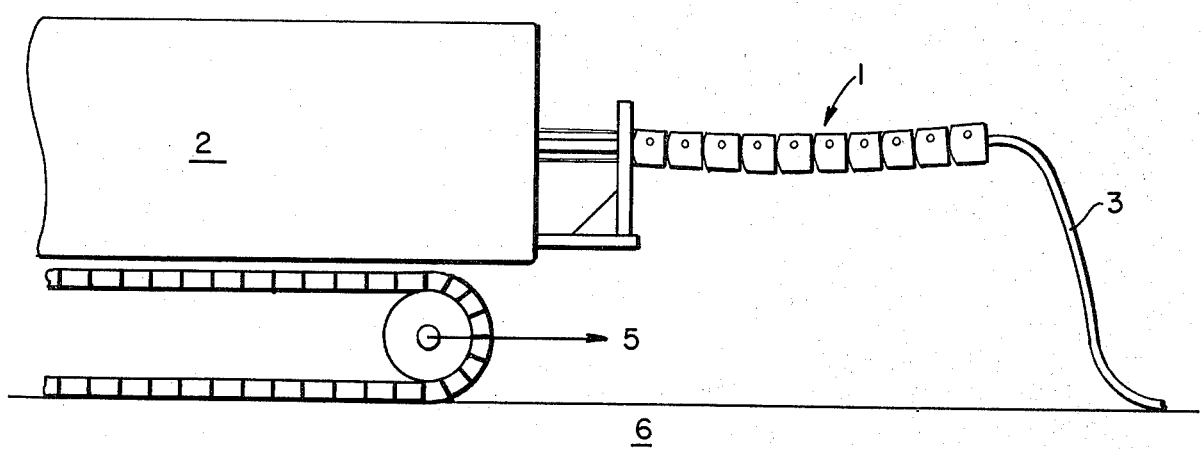
Figure 2C:
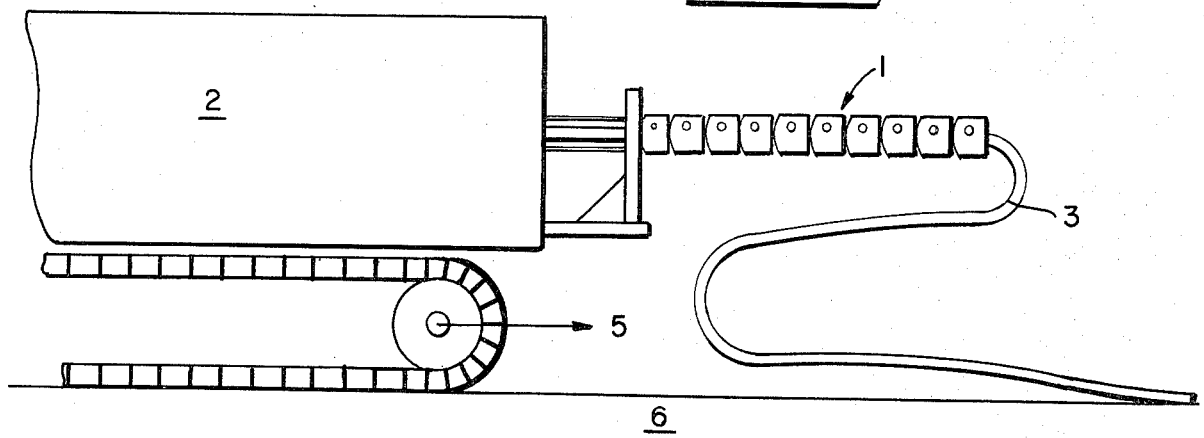

FIG. 1 shows the cable lifting device 1 mounted on a representative piece of machinery 2 that is required to move forward and backward during its operation. As shown in FIG. 2a, when the machinery 2 is moving in a forward direction 4, the cable lifting device 1 is relaxed and allows flexible movement and handling of the cable 3. However, as shown in FIG. 2b, when the machinery is moving in a backward direction 5, the device 1 stiffens itself and raises the portion of cable 3 retained in the device 1, off the ground 6, to a horizontal position parallel above the ground 6. As shown in FIG. 2c, when the device is in the horizontal stiffened position, the machinery 2 can then move in a backward direction 5 for a distance twice the length of the cable 3 actually lifted before the cable is in a position to be run over and possibly damaged by the machinery 2.

As shown in FIG. 1, the device 1 is mounted on the rear of the machinery 2 by means of a base plate 8, said base plate 8 being horizontally attached to the machine 1. Mounted on the base plate 8 is a vertically oriented bearing plate 9 and a brace 10 to support the bearing plate 9. The bearing plate 9 has a hole 24 for the passage of the flexible cable 3 through to the machinery 2, a pair of lower holes 25 through which a pair of retaining wires 11 pass, and a pair of upper holes 26 through which a pair of cable lifting wires 13 pass.

Mounted to the flexible cable 3 are a plurality of generally rectangular-shaped blocks 7. As shown in FIGS. 3, 4, and 5, each block has a centrally located longitudinal channel 17 through which the cable 3 is mounted, said blocks 7 retained on the cable 3 by a retaining bolt 18 which passes through a transverse hole 19 for that purpose in said block 7. The retaining bolt 18 is held in place by a nut 20 attached to the end of said bolt 18. The sides 16 of the blocks 7 are flat, while the front face 14 is convex shaped and the back face 15 is concave shaped so that the front face of each block will fit flush against the rear face of the adjacent block when said blocks are pulled closely together.

A pair of lower passages 21 run longitudinally through the lower portion of each block 7. These lower passages 21 carry retaining wires 11. The forward end of retaining wires 11 are attached to a tensioning spring 12, with the trailing ends of the retaining wires 11 attached to the back face 15 of the rearmost block 7. The spring 12 tensions the retaining wires 11 with sufficient force to keep the blocks loosely in place along the flexible cable 7.

A pair of upper passages 22 run longitudinally through the upper portion of the blocks 7. These upper passages 22 carry the cable lifting wires 13. The trailing rear end of wires 13 are attached to the rearmost block, and the forward end of each of said wires is attached to a cable lifting wire retracting means 23 for tensioning said lifting wires 13 by retracting said wires 13 toward the machine body 2 on which, said retracting means 23 is mounted as shown in phantom in FIG. 1.

In operation, as shown in FIGS. 1 and 2a, the retaining wires 11 keep the plurality of blocks 7 in relatively close proximity along the flexible cable 3 when the machinery is in forward motion 4. Because the blocks are not cupped closely together, the cable 3 remains flexible and can move freely. However, as shown in FIGS. 1 and 2b, when the machinery is placed in backward motion 5, the cable lifting wires 13 are tensioned by the cable lifting wire tensioning means 23. The retraction of these wires 13 pulls the plurality of blocks into face-to-face abutment, the center of the front face 14 of the forwardmost block pressed against the bearing plate 9, with the remaining blocks 7 pulled tightly together with the back face 15 of one block bearing against the front face 14 of the succeeding block, so as to form a slightly arched rigid body. As the cable lifting wires 13 are retracted further, as seen in FIGS. 1 and 2b, the now rigid blocks 7 rotate upward as the front face 14 of the forwardmost block pivots to bring that portion of the face 14 where the cable lifting wires passages 22 are located into contact with the upper holes 26 in the bearing plate 9, thus causing the entire rigid body of blocks to move to a horizontal position above the ground 6. Once the machinery 2 moves in a forward direction 4 again, the cable lifting wires retracting means 23 is deactivated, the cable lifting wires 13 are untensioned, the blocks 7 become loose, and the portion of the cable 3 within the device 1 is again flexible and easily manipulated.

I claim:

1. An apparatus for lifting and stiffening a predetermined length of flexible cable is attached to the rear of a machine body and comprises a plurality of generally rectangular-shaped blocks, each block having flat sides, a convex-shaped front face and a concave-shaped back face and a longitudinal channel therethrough for mounting each block on the cable; the front face of one block facing the back face of the successive block, each block having at least one longitudinal hole from front to back in the lower portion thereof for passage of a block retaining wire therethrough, and at least one retaining wire for keeping the blocks closely together and longitudinally oriented along the length of the cable when said blocks are not in abutment, said retaining wire passing through the lower longitudinal hole provided in each block, the first end of said retaining wire being attached to the back face of the rearmost block, means mounted on said machine body for tensioning said retaining wire, the second end of said retaining wire being attached to said means for tensioning said retaining wire;

a frame for mounting said apparatus to the machine body, said frame having a base plate which is anchored to the machine body, a bearing plate for preventing lateral movement of the blocks when the cable is lifted; said frame having an aperture of sufficient diameter to accommodate the cable, and an additional aperture of sufficient diameter to accommodate the retaining wire therethrough;

a further means passing through said blocks for drawing said blocks into abutment with one another to thereby form a rigid support to lift the cable from a ground surface.

2. An apparatus for lifting a predetermined length of flexible cable, as recited in claim 1, wherein the means for tensioning said retaining wire is comprised of a tensioning spring, one end of which is attached to the forward end of the retaining wire, and the second end of which is attached to the machine body.

3. The apparatus as defined in claim 1 wherein said means for lifting the cable is comprised of:

a pair of cable lifting wires, said lifting wires passing through holes in the upper portion of each block, the forward ends of which are attached to a means for retracting said cable lifting wires toward the bearing plate, the second ends of said wires being fixed to the upper portion of the back face of the rearmost block so that, when the means for retracting the cable lifting wires is activated, said wires will cause the blocks to fit closely together, convex front face to concave back face, and stiffen into a rigid, slightly arched longitudinally extending body, lifting said cable out of the path of movement of the machine body to which it is attached.

* * * * *